Patented Dec. 26, 1950

2,535,999

UNITED STATES PATENT OFFICE 2,535,999

METHOD FOR PRODUCING CATHODE COATING COMPOSITIONS

George H. Bouchard, Ipswich, Mass., assignor to Sylvania Electric Products Inc., Salem, Mass., a corporation of Massachusetts No Drawing. Application May 12, 1945, Serial No. 593,535

3 Claims. (Cl. 106—286)

This invention relates to cathode coatings for electron tubes, lamps and the like and particularly to carbonates with which such cathodes are generally coated prior to activation.

I have found a triple carbonate, or mixture of barium, strontium and calcium carbonates to be quite effective, although the invention can be used with other suitable carbonates also. The carbonates may be formed by precipitation from an ammoniacal solution of the nitrates with ammonium carbonate. The particle size and purity of the resultant precipitate are quite important, the purity desired being as high as possible and the particle size as small as possible.

It is accordingly an object of this invention to produce a carbonate of high purity and small particle size. A further object is to achieve this without the need for critical values of time, temperature, agitation, and rate of addition of ammonium carbonate. In fact, I found that even if these variables were all kept constant, the particle size would still be variable.

I have found that if a large amount of ammonia was added just before precipitation, I could obtain small particle size and high purity, even despite considerable variation in the otherwise critical factors already mentioned.

A feature of the invention is accordingly the addition of ammonia just before precipitation. Some ammonia may be lost by volatilization but the results are quite remarkable. The particle size may be controlled by the amount of ammonia used. For example, four batches made with a small amount of ammonia, keeping the critical factors fixed, varied from 1.17 to 1.70 in bulk density reciprocal (cubic centimeters per gram) while four batches with my large excess of ammonia varied only from 2.69 to 2.86. The particle size was thus not only much smaller with a large amount of ammonia but more uniform and reproducible.

I have found that without ammonia, the particles are large and chubby, about 14 microns in dimension, and if the concentration of ammonia is less than 0.15 molal the particles are still large, of about 5 to 9 microns size. If the concentration is 0.3 or more, the particles are largely needle-like crystals and quite small. An excess of 0.6 produces very small particle size. Some of the needle-like crystals will be long, thin needles, and in some the needles will join to form V-shaped and Y-shaped particles, and some with a few additional arms than the V or Y have. But all have the same needle-like structure which clearly differentiates them from the larger, chubby particles present when no ammonia, or only a little, is present. A single needle will be about 1 micron wide and 4.5 microns long.

In practising the invention I may dissolve, for example, 16 pounds of barium nitrate, 11 pounds 2 ounces of strontium nitrate, and 4 pounds 1 ounce of calcium nitrate in 40 gallons of water at room temperature. A motor stirrer may be used if desired to insure that the nitrates are thoroughly dissolved. 250 cc. of nitric acid is then added, and hydrogen sulphide is passed through the solution at the rate of 2 or 3 bubbles per second for 30 minutes. The solution may then be covered and allowed to stand for 2 hours, after which the solution is filtered to remove the precipitate which may be discarded.

The filtrate is then heated to 95° C. and 1400 cc. of ammonium hydroxide is added. 250 cc. of ammonium sulphide is then added and stirred. The heat may then be turned off and the solution allowed to stand over night. The solution may then be filtered, for example, through an Ertel filter press, and should be cooled down to room temperature before filtering. 450 cc. of hydrogen peroxide is then added and the solution stirred. After standing over night the solution is again filtered, for example, through an Ertel filter press.

The ammonium carbonate mixture which will eventually be added to the foregoing filtrate for precipitation may be prepared by adding 18 pounds 12 ounces of ammonium carbonate, 500 cc. of ammonium hydroxide, and 100 cc. of hydrogen peroxide to 10 gallons of distilled water. This solution when at room temperature is filtered through Buchner funnels. The solution is then covered and heated slowly to about 60° C. The heating process may, for example, take about 2 hours.

Meanwhile, the purified nitrate solution previously described may be heated to 80° C. This should take about 60 minutes to heat and be timed to reach temperature at the same time as the ammonium carbonate. The nitrate solution should then be stirred and 3 liters of ammonium hydroxide added to it. The previously prepared carbonate solution should then be added to the nitrate solution, for example, by being dipped into that solution through a Buchner funnel. The ammonium carbonate should be added immediately after the ammonium hydroxide in order to prevent loss of the hydroxide. The ammonium carbonate should be put into the solution as soon as possible, preferably in a continuous stream at a time of about 5 minutes. The solution should be stirred while the carbonate is being added. The stirring may be stopped when the precipitation is complete and the precipitate allowed to settle, for example, about 15 minutes or until the top liquor is clear.

The clear top liquor may then be pumped out and the precipitate rinsed thoroughly with distilled water. The precipitate is then filtered and dried. In preparing the nitrate solution the hydrogen sulphide and the ammonium sulphide removes undesirable metal impurities. The hydrogen peroxide then removes any residual sulphides.

In the ammonium carbonate solution the hydrogen peroxide is present to oxide any ferrous impurities present to the ferric state so that they will be insoluble and precipitate out. The ammonium hydroxide in the carbonate solution prevents effervescence when the carbonate is heated.

The use of ammonium hydroxide in the nitrate solution has the advantage in addition to its effect on particle size, that it eliminates the effervescence which would otherwise occur when the ammonium carbonate is added. This allows doubling the capacity of the manufacturing equipment because room does not have to be provided for the effervescing gases, whose foam otherwise tends to carry the precipitated powder out of the tank in which it is being precipitated.

My process produces a triple carbonate substantially free from sodium and potassium, which do not appear present even on spectrographic analysis. This is quite important if the carbonate is used to coat ultra-high frequency tubes and pulse-producing tubes. The coating may be applied to the cathodes in the usual manner with lacquers, or with the centrifuge method described in a patent application Serial No. 595,309 filed May 23, 1945 by William P. Toorks for Cathode and Method of Making, now Patent No. 2,433,821.

With ordinary methods, C. P. chemicals are used and purified, but my purification method allows the use of ordinary technical grade chemicals at considerable reduction in cost.

What I claim is:

1. The method of controlling the particle size and shape of triple carbonate crystals of the alkaline earth metals precipitated from a nitrate solution by the addition of ammonium carbonate which comprises adding a large amount of ammonia to the nitrate solution just before precipitation to produce the desired particle size.

2. The method of producing a powder of barium, strontium and calcium carbonates which comprises the steps of dissolving the nitrates of these metals in water, adding a large amount of ammonium hydroxide to the nitrate solution just before precipitation and then adding a solution of ammonia and ammonium carbonate to cause precipitation.

3. The method of producing a cathode-coating powder of barium, strontium and calcium carbonates which comprises the steps of dissolving the nitrates of said metals in water removing undesirable metallic impurities by the addition of hydrogen sulphide and ammonium sulphide to precipitate them out as impurities and filtering the same, adding hydrogen peroxide to remove the residual sulphides and filtering the same, heating the resultant nitrate solution, adding a large amount of ammonium hydroxide to the resultant nitrate solution and then precipitating the metallic carbonates by the addition of ammonium carbonate.

GEORGE H. BOUCHARD.

REFERENCES CITED

The following references are of record in the file of this patent:

UNITED STATES PATENTS

| Number | Name | Date |
|---|---|---|
| 301,383 | Mebus et al. | July 1, 1884 |
| 805,581 | Pennock | Nov. 28, 1905 |
| 1,865,437 | Fredenburgh | July 5, 1932 |
| 1,939,075 | McCulloch | Dec. 12, 1933 |

OTHER REFERENCES

A Comprehensive Treatise on Inorganic and Theoretical Chemistry, Mellor, vol. I, 1922, page 941.

Analytical Chemistry, Treadwell-Hall, vol. I, 7th ed., 1930, page 120.